Figures 1, 2:
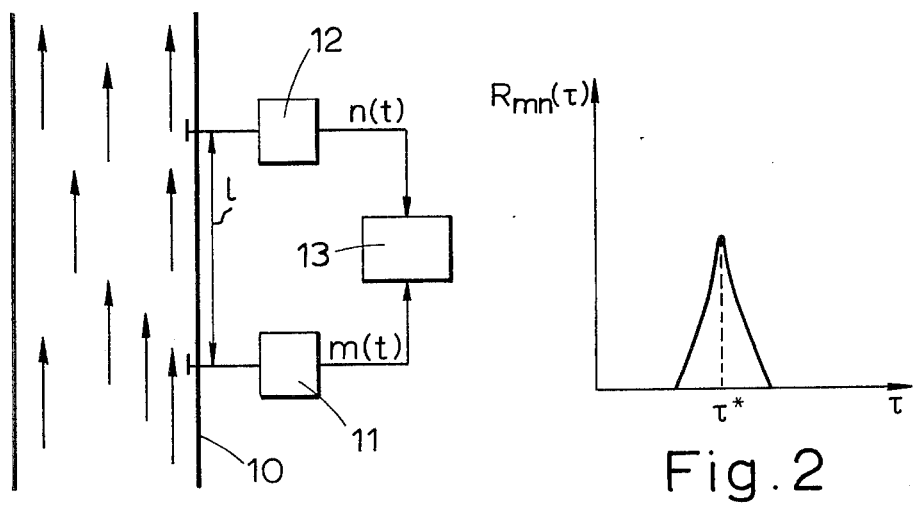

United States Patent [19]

Beck et al.

[11] 4,007,754
[45] Feb. 15, 1977

[54] FLOW CONTROL SYSTEM

[75] Inventors: Maurice Sidney Beck, Ilkley; Robert Malcolm Henry, Sowerby Bridge, both of England

[73] Assignee: National Research Development Corporation, London, England

[22] Filed: Apr. 2, 1975

[21] Appl. No.: 564,653

[30] Foreign Application Priority Data

Apr. 9, 1974 United Kingdom ............ 15764/74

[52] U.S. Cl. .................................... 137/2; 137/87; 137/487.5; 73/28; 73/194 E
[51] Int. Cl.² ...................................... G01F 1/00
[58] Field of Search ............... 137/2, 8, 10, 487.5; 73/194 E, 194 F, 28; 241/15, 38

[56] References Cited
UNITED STATES PATENTS

| | | | |
|---|---|---|---|
| 2,948,295 | 8/1960 | Smith, Jr. ...................... | 137/487.5 |
| 3,015,768 | 1/1962 | Hornfeck et al. ........... | 137/487.5 X |
| 3,017,556 | 1/1962 | Smoot ........................... | 137/487.5 X |
| 3,595,078 | 7/1971 | Beck et al. .................... | 73/194 F |
| 3,636,763 | 1/1972 | Beck ............................... | 73/194 E |
| 3,757,808 | 9/1973 | Peterson ........................ | 137/2 |
| 3,914,581 | 10/1975 | Gilson .......................... | 137/487.5 X |

*Primary Examiner*—Alan Cohan
*Attorney, Agent, or Firm*—Cushman, Darby & Cushman

[57] ABSTRACT

In a process for controlling a particle flow system which is to be operated at slightly above the velocity at which saltation occurs, a cross correlation technique is used to determine the spread of particle velocities in the system and this is compared with a signal representing the desired spread to produce an error signal indicating the desired mean velocity of particle flow. A second cross correlation technique, having a shorter integration period, is used to determine the actual mean particle velocity and this is compared with the first error signal to produce a second error signal to control the flow rate of the conveying fluid.

11 Claims, 8 Drawing Figures

FLOW CONTROL SYSTEM

The present invention concerns control systems for controlling flowing materials and is particularly concerned with controlling the flow of particulate materials.

Environmental considerations have favoured the increasing use of pipelines to transport particulate materials over long distances. Although pipeline transport removes many of the problems associated with other methods of transport it does introduce several problems that have to be considered. Thus the conveying velocity should be as low as possible in order to minimise pumping costs and wear on equipment; furthermore when fragile materials are being conveyed there must be a minimum risk of breakage. These criteria obviously require a minimum conveying velocity. However there then arises the constraint that the pipe must never become blocked.

In accordance with the present invention, there is provided a process for controlling particle flow systems comprising deriving a correlation function the position of the peak of which represents the mean velocity of particle flow, deriving from the correlation function a electrical signal which is a function of the particle velocity spectrum in the system, providing another electrical signal dependent on the desired particle velocity spectrum and comparing the two signals to derive an error signal for controlling the mean velocity of particle flow.

In accordance with another aspect of the present invention, there is provided apparatus for controlling particle flow systems comprising means for deriving a correlation function the position of the peak of which represents the mean velocity of particle flow, means for deriving from the correlation function a first electrical signal which is a function of the particle velocity spectrum in the flow system, means for providing another electrical signal dependent on the desired particle velocity spectrum in the system, means for comparing the two signals to derive an error signal for controlling the mean velocity of particle flow.

The term "particle velocity spectrum" will be more fully defined in the description of an embodiment of the invention which follows hereinafter.

Figures 3, 4:
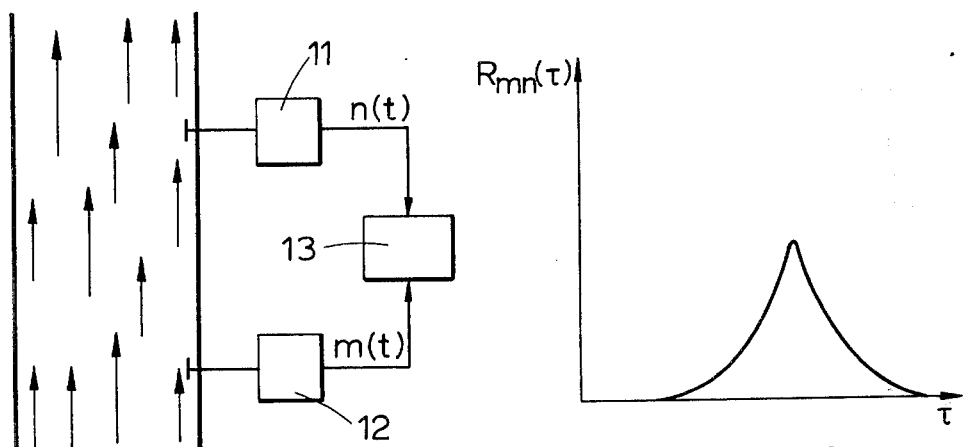
Figure 5:
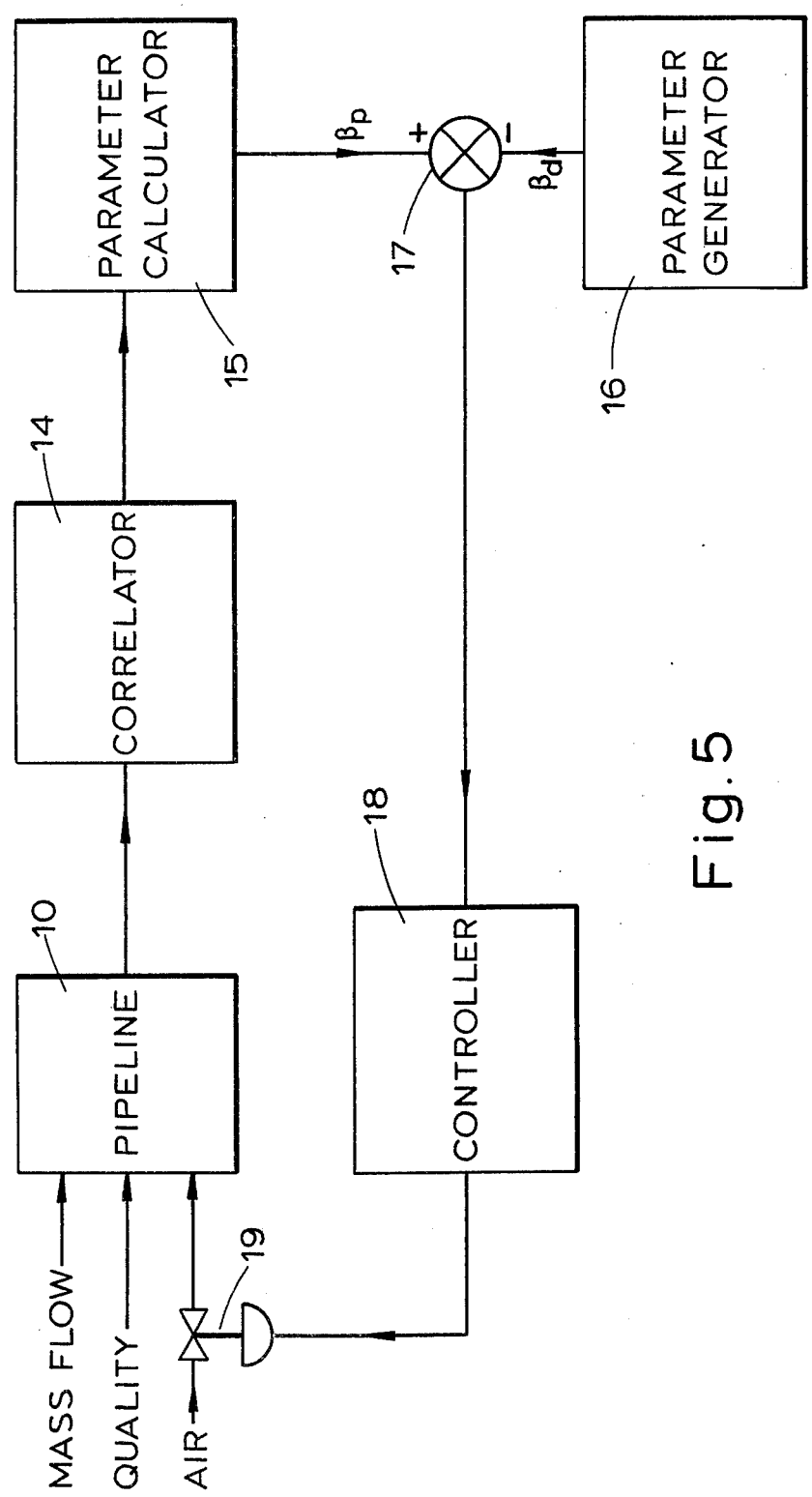
Figure 6:
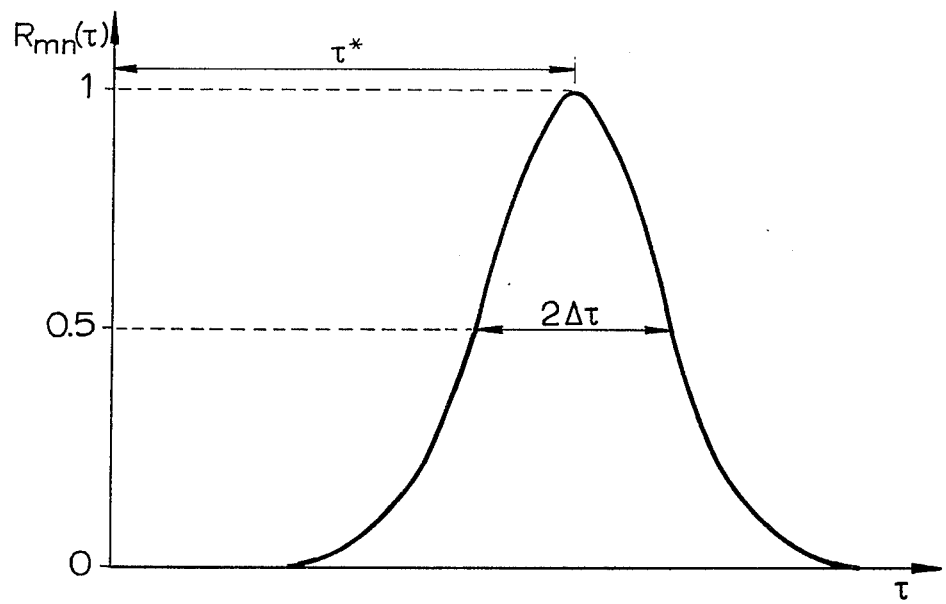
Figure 7:
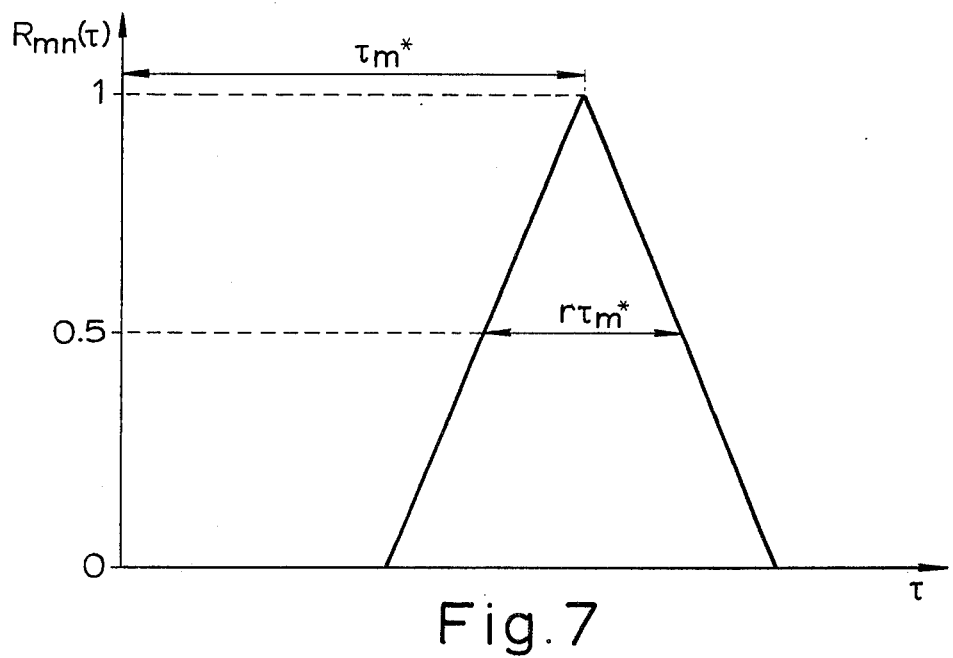
Figure 8:
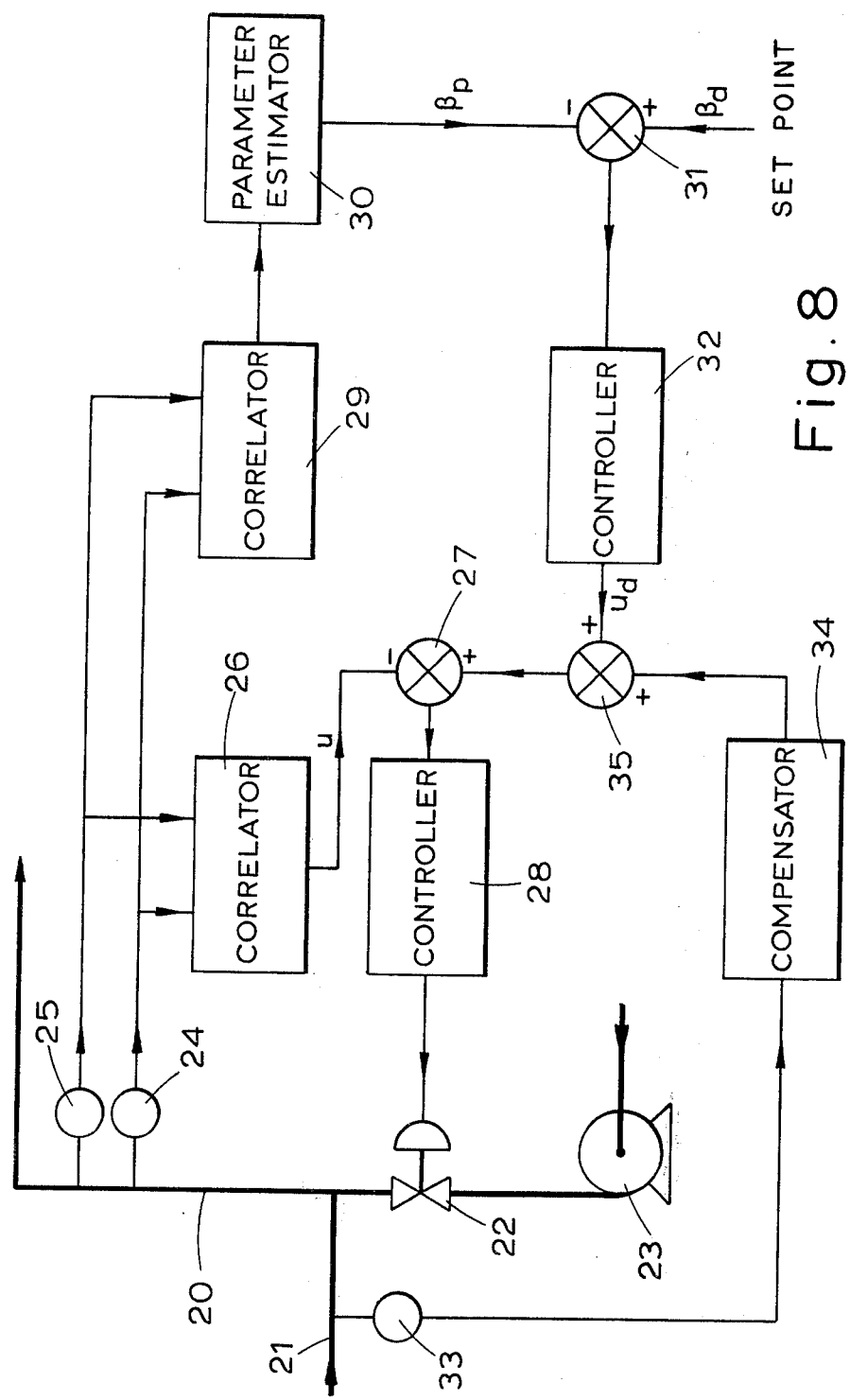

An embodiment of the present invention will now be described by way of example with reference to the accompanying drawings in which:

FIG. 1 is a schematic diagram of a pipeline in which particulate material is conveyed in a high velocity airstream and apparatus including a correlator for measuring the flow velocity, FIG. 2 is a graph illustrating a cross correlation function obtained from the apparatus shown in FIG. 1, FIG. 3 is a schematic diagram similar to FIG. 1 with velocity of the airstream reduced, FIG. 4 is a graph illustrating a cross correlation function obtained from the apparatus shown in FIG. 3, FIG. 5 is a block diagram of a system in accordance with the present invention for controlling the velocity of particles in a pipeline to a minimum safe value, FIGS. 6 and 7 show two graphs illustrating a step in the calculation of the performance parameter used to control the particle flow, and FIG. 8 is a block diagram of a more detailed embodiment of a particle flow control system constructed in accordance with the present invention.

The present invention is concerned with controlling the flow of particulate materials in pipelines so that the conveying velocity is controlled to an ideal or minimum value which is always safely above the velocity at which pipe blockage can occur. In practice is it not possible to set the velocity at a fixed value and leave it there, because the ideal velocity is not constant for a given system. The ideal velocity depends on the hydrodynamic behaviour of the solids when they are being conveyed and this behaviour varies with the quantity, particle size density and shape of the material. This ideal velocity is normally slightly higher than the theoretical minimum for conveying the material to avoid the risk of blockage. In order to arrive at a performance parameter suitable for controlling the flow rate at this ideal value consider the diagrams shown in FIGS. 1 and 3.

FIG. 1 illustrates the situation when particles are being conveyed upwardly in a high velocity airstream in a pipeline 10. Under these conditions all the particles are subject to a high degree of turbulence, which means that an observer moving at the average flow velocity would see particles moving in all directions around him, any particle which entered the slow moving boundary layer of air near the wall would enter that layer with appreciable velocity and would bounce back from the wall into the highly turbulent region nearer the centre of the pipe. This adds up to a picture in which all particles, irrespective of individual differences of size, shape etc., on average travel in the same aerodynamic manner. Hence all particles will have similar vector components of velocity in an axial direction, as shown by the vectors in FIG. 1 all having equal length. The velocity of the particles is measured using a cross correlation method of the kind described in U.S. Pat. No. 3,595,078. Thus two transducers 11 and 12 are provided giving outputs $m(t)$ and $n(t)$ respectively at time $t$ to a correlator 13. Now the cross correlation function between transducers 11 and 12 which measures the instantaneous concentration of particles in their vicinity, is a direct measure of the dynamics of particle transport in the pipeline 10 between the two transducers 11 and 12.

Thus under high velocity flow conditions the cross correlation function given by $$R_{mn}(\tau) = \int_0^T n(t) \, m(t - \tau) \, dt$$

will be narrow and well defined as shown in FIG. 2, T being the integration period and $m(t - \tau)$ being the output from the upstream transducer 11 delayed by a time delay $\tau$. If it were possible to use transducers with infinite bandwidth, and if the turbulence were truly white noise, the gross correlation would be an impulse of time delay $\tau^*$ given by $\tau^* = \rho/\alpha$ where $\rho$ is the spacing between the transducers and $\alpha$ is the transport velocity. In practice the limited bandwidth of turbulence and the limited bandwidth of the transducers causes the cross correlation to degenerate into an approximation to an impulse shown in FIG. 2.

In contrast consider the conditions illustrated in FIG. 3 where the flow is near the "ideal" or optimum velocity. Here the criterion is that the average velocity of the particles should be as low as possible to minimise pumping costs and also minimise particle breakage which would result from high speed collisions with the conveyor wall and between particles. Under these conditions a moving observer would see particles moving in a turbulent manner around him, but those particles which entered the slower moving boundary layer near the pipe wall, would not be vigorously bounced from the wall into the central core, hence they would spend a considerable amount of time in the boundary layer and would therefore travel at a lower mean velocity than would those particles which had remained entrained in the higher speed flow near the centre of the pipe. In other words the particles will have mean velocities spread over a considerable range due to the partial de-entrainment, thus the axial component of the velocity vector will vary from one particle to another as shown by the vectors in FIG. 3 having differing lengths. Since, as described above, the cross correlation $R_{mn}(\tau)$ of the transducer outputs displays the transit time of the particles, a spread of velocities leads to a broad cross correlation as shown in FIG. 4. It is this spread of velocities which gives the particle velocity spectrum.

For gas/solids systems a capacitance or electrodynamic transducer can be used to detect the concentration of particles present, for liquid/solid systems a conductivity transducer can be used for this purpose (Ong and Beck, "Slurry Flow Velocity, Concentration and Particle Size Measurement using Flow Noise and Correlation Techniques", Institute of Measurement and Control, October 1974, Conference on Measurement & Control in the Pulp and Paper Industry). Since each transducer output represents the effect of turbulence on the particle spacing, and provided that the transducers are reasonably close together (between say 0.5 and 3 pipe diameters) so that the turbulence pattern does not decay significantly between them, then the cross correlation function will depend on the dynamics of the solids transport process as shown above.

The widening of the cross correlation function (FIG. 4) accordingly can be used to show that the ideal velocity has been reached.

FIG. 5 is a block diagram of the essential features of a system for controlling a process comprising the particle flow in a pipe system which includes the pipeline 10, in accordance with the principle laid down previously.

The pipeline 10 can be considered to have three principal input variables, the material mass flow and quality which are both uncontrolled and the flow velocity which is the controlled variable. Data from the process is measured and cross correlated in a correlator 14 as described later to give the cross correlation model of the process. A single parameter $\beta_p$, which represents the performance of the process, is then computed in a parameter calculator 15 as described below.

When discussing FIGS. 1 and 2 it was shown that the spread of the cross correlation function is equivalent of the spread of the particle velocities and hence the cross correlation can be regarded as representing an approximate histogram of the particle velocity distribution herein referred to as "the particle velocity spectrum", (the vertical scale is proportional to the square of the number of particles at each particular velocity because the cross correlation is the product of two quantities, both proportional to number of particles; however, this detail difference does not affect the argument that is given below). It is accordingly necessary to calculate this spread so as to find a performance parameter representing the spread suitable for controlling the flow of the material.

Consider the graphs shown in FIGS. 6 and 7.

The spread of particle velocities will have a "Gaussian" form as is shown in FIG. 6 and an estimate of this spread can be given by a single parameter $\beta'_p$ representing the shape of the cross correlation model. For example $\beta'_p$ could be given by:

$$\beta'_p = \frac{\tau^*}{2\Delta\tau}$$

where $\tau^*$ is the time delay of the peak and $2\Delta\tau$ is the width of the peak at half the height.

However, individual estimates of a cross correlation are always subject to error and such errors would have a considerable effect on the measurement of the width $2\Delta\tau$. A more reliable estimate of the correlation spread can be obtained by taking the area under the function, because the inaccuracies of individual estimates are averaged out in computing the area (Beck, Lee & Stanley-Wood "A New Method for Evaluating the Size of Solid Particles Flowing in a Turbulent Fluid", Powder Technology, Vol. 8, pages 85–90, 1973). Hence a more reliable performance parameter is given by:

$$\beta_p = \frac{\tau^*}{A} \tag{1}$$

where $A$ is the area under the normalised cross correlation function (the normalising process makes the maximum cross correlation unity, so that the area under the normalised curve represents the spread of velocities and does not depend on the total number of particles being conveyed).

A signal representing the desired value $\beta_d$ of the performance parameter is produced by a parameter generator 16 in FIG. 5. The value to which the generator 16 should be set could be determined analytically if the optimum transport model of the process were known. However the complex nature of two phase turbulent flow makes a precise analytical approach very difficult, so in practice it would be more convenient to base the desired performance parameter on the following empirical considerations.

For convenience in analysis, it is assumed that we can approximate the Gaussian model of FIG. 6 by the isosceles triangular model shown in FIG. 7. Now define a parameter $r$ to represent the spread of particle velocities, where the width of the function at half the peak height is $r\tau^*$. From Equation 1 the model performance parameter $\beta_d$ is given by:

$$\beta_d = \frac{\tau^*_m}{A_m}$$

and from FIG. 5

$$A_m = r\tau^*_m$$

$$\therefore \beta_d = \frac{1}{r} \tag{2}$$

In the absence of prior experience a reasonable approach would be to initially make $r = 0.1$ and then to operate the system and successively increase the value of $r$ until the powder flow showed signs of saltation (settling out) in horizontal sections of the conveyor. It would then be prudent to adjust $r$ to a value of say half its value for the saltation condition to give an adequate velocity margin, so ensuring long term reliability of the conveying system.

The remaining part of the control system of FIG. 5 comprises a comparator 17 which forms the error signal by subtracting the desired value $\beta_d$ from the measured value $\beta_p$ and a controller 18, which adjusts a valve 19 in the air supply in the pipeline 10 in accordance with a standard control equation to minimise the error.

In practice it may be advisable to use a cascade control system with direct velocity control instead of the indirect system shown. This is because the time taken to obtain an accurate process model will be long, hence the stability of the control loop in response to fast load changes (e.g. changes in particle flow size and shape) would be poor unless a more direct velocity measurement is made. This can be done by cross correlating the outputs of the transducers already installed for the model estimation. Fortunately a shorter cross correlation time can be used for velocity measurement than is required for accurate model estimation. Such a cascade control is described with reference to FIG. 8.

FIG. 8 shows a control system for controlling the flow of solids in a pipeline 20. The solids are injected into the pipeline 20 from a solids inlet pipe 21 downstream of a control valve 22 controlling flow of the transporting fluid from a pump 23.

A pair of transducers 24, 25 are used to measure both the mean velocity of the flowing solids and for the calculation of the particle velocity spectrum. For hydraulic transport systems conductivity transducers are recommended whilst for pneumatic transport electrodynamic transducers are most suitable.

The mean velocity of the transporting fluid is measured by a cross correlator 26. A full description of the use of cross correlation techniques to measure flow velocity is given in U.S. Pat. No. 3,595,078. The integration time of the correlator 26 may be, for example, about 1 second. This allows a sufficiently accurate estimate of the velocity. A suitable set of logical operation of the correlator 26 on the two time series from the transducers 24 and 25 respectively are as follows:

1. find mean of each series
2. for each series subtract mean from each value in series so that series has zero mean
3. find standard deviation of each series
4. divide through by standard deviation
5. sum products of corresponding terms in each series
6. record result
7. shift one series one place (left if shifted series is from transducer 25, right if shifted series is from transducer 24) and repeat from step 5 until the desired number of cross correlation points are defined
8. set record of peak value of correlation points to zero
9. compare recorded value of correlation point with record of peak value and, if greater, replace recorded peak value by such greater value and note position
10. repeat step 9 until all data examined The noted position of the final peak value is the time delay of the peak of the cross correlation function and is thus inversely proportional to mean particle velocity $u$.

The output of the correlator 26 is taken to a comparator 27 the other input of which is a signal, indicative of the desired mean particle velocity, derived in a manner which will be described hereinafter. The error signal from the comparator 27 is supplied to a controller 28 which controls the valve 22 so as in turn to control the velocity of the conveying fluid. The controller 28 operates as follows:

1. add error to sum of all previous errors $\epsilon e$
2. compute change in error from last sample $\Delta e$
3. compute K $(e + k_i \epsilon e + k_d \Delta e)$ where K, $k_i$ and $k_d$ are constant, $k_i$ and $k_d$ depending on the sampling period
4. store current error for use in step 2 next time round The value computed at step 3 is the output signal from the controller 28 to the valve 22.

In order to provide a signal indicative of the desired mean particle velocity for the second input of the comparator 27, the spread of particle velocities is calculated in a second cross correlator 29 similar to the correlator 26 but having a longer integration period, for example about 30 seconds. The operation of the correlator 29 is the same as that of the correlator 26. In addition the standard deviation of the cross correlation points, available from step 7, is calculated to obtain a signal indicating the value of $A_m$.

Although two separate correlators have been described, it is, of course, perfectly possible to provide a system in which a single correlator is used to provide both the short and long term integration. Because the second correlator 29 is part of an adaptive loop its integration time can be much longer than that of correlator 26. Thus a much more accurate cross correlation function can be obtained.

The output from the correlator 29 is supplied in the form of electrical signals to a parameter estimator 30 which is a digital processor programmed to perform the calculation given in equation (1) discussed with reference to FIGS. 6 and 7. Thus the output of the parameter estimator 30 is an electrical signal $\beta_p$ dependent on the velocity spectrum of the solids in the pipeline 20.

The signal $\beta_p$ is supplied to one input of a comparator 31 the other input of which is supplied with a signal $\beta_d$ representing the set point or desired velocity spectrum. The resultant error signal is taken to a controller 32 which gives an output signal representing the desired velocity required to maintain the velocity spectrum of the solid flow at the required value. The controller 32 operates in a manner identical to the controller 28 already described.

Thus the system can be considered as having two main control loops, a first loop comprising the cross correlator 26 and controller 28 having a relatively fast time response and measuring mean particle velocity, and a second loop comprising the cross correlator 29, parameter estimator 30 and controller 32 with a slower response, measuring the particle velocity spectrum and which acts to adapt the first loop so that the flow of the solids in the pipeline 20 is maintained at an optimum velocity.

The output from the controller 32 could be applied directly to the comparator 27. However, the system of FIG. 8 is also provided with a "feed forward" loop in order to avoid the possibility of major changes in solid feed rate causing blockages which otherwise could occur within the correlation integration time of the second loop. The solids input rate through the pipe 21 is measured by a solids mass-flowmeter 33 which may be of the kind described in U.S. Pat. No. 3,636,763. The output at the flowmeter 33 is connected to a compensator 34 which can conveniently be a differentiator or lead circuit to produce a loss/gain derivative term of the solid feed rate. The output of the compensator 34 is conneced to one input of a summing junction 35, the other input of which is connected to the output of the controller 32. The output of the summing junction 35 is connected to the second input of the comparator 27.

Any of the component blocks of the systems shown in FIGS. 5 and 8 may take the form of special purpose hardware. Alternatively, one or more of the blocks, other than the valve 22, the pump 23, the transducers 24 and 25 and the flowmeter 33 may be implemented by a suitably programmed computer.

The distance between the solids injector and the transducers, or between the nearest bend and the transducers, should be sufficient to allow the solids particles to accelerate to their equilibrium velocity. Reasonable minimum distances are 30 centimeters or 5 pipe diameters (whichever is the greater) for hydraulic transport and 300 centimeters or 5 pipe diameters (whichever is the greater) for pneumatic transport. The spacing between the two transducers should be about 1 pipe diameter.

What is claimed is:

1. A process for controlling the flow of particles conveyed by means of a flowing fluid comprising obtaining first and second electrical signals by sensing the passage of naturally occurring random disturbances in the flow of particles respectively past first and second points separated by a known distance along a path for the flow of particles, producing a cross-correlation function of said first and second electrical signals over a predetermined integration time deriving from the correlation function a third electrical signal which is a function of the spread of particle velocities in the particle velocity spectrum in the system, providing a fourth electrical signal which is a function of the desired spread of particle velocities, comparing the third and fourth signals to derive an error signal and varying the velocity of said fluid in response to said error signal.

2. A process as claimed in claim 1, further comprising deriving from said error signal a fifth electrical signal indicating a desired mean velocity of particle flow, producing a second cross-correlation function of said first and second electrical signals over a shorter integration time than said predetermined integration time, deriving a sixth electrical signal indicating the position of the peak of said second correlation function and comparing the fifth and sixth electrical signals to derive a second error signal for controlling said mean velocity.

3. A process as claimed in claim 2, wherein particles are supplied to said system at a rate which is subject to variation, said process further comprising detecting changes in said rate of supply of particles and modifying said fifth electrical signal to increase said flow rate when an increase in particle size is detected.

4. A process as claimed in claim 1, in which the functions of the spread of particle velocities on which said third and fourth electrical signals are dependent are the actual and desired widths respectively of the correlation function at half peak amplitude.

5. A process as claimed in claim 1, in which the functions of the spreads of particle velocities on which said third and fourth electrical signals are dependent are the actual and desired areas respectively under the normalized equivalent of the correlation function.

6. Apparatus for controlling particle flow systems comprising first and second transducers located at position separated by a known distance along a path for the flow of particles conveyed by a fluid and arranged to produce respective first and second electrical signals in response to disturbances in said flow of particles, means for producing a cross-correlation function, over a predetermined integration time of said first and second electrical signals, means for deriving from the correlation function a third electrical signal which is a function of the spread of particle velocities in the particle velocity spectrum in the flow system, means for providing a fourth electrical signal which is a function of the desired particle velocity spectrum in the system, means for comparing the third and fourth signals to derive an error signal and means responsive to said error signal for controlling the mean velocity of particle flow.

7. Apparatus as claimed in claim 6, including means for deriving from said error signal a fifth electrical signal indicating a desired mean velocity of particle flow, means for producing a second cross-correlation function of said first and second electrical signals over a shorter integration time than the first correlation function, means for deriving a sixth electrical signal indicative of the position of said peak and means for comparing said third and fourth electrical signals to derive a second error signal for controlling said mean velocity.

8. Apparatus as claimed in claim 7, including means for detecting changes in the rate of supply of particles to said system and means for modifying sid fifth electrical signal to increase the mean velocity of particles when an increase of rate of supply of particles is detected.

9. Apparatus as claimed in claim 6, in which the functions of the spreads of particle velocities on which said third and fourth electrical signals are arranged to be dependent are the actual and desired width of the correlation function at half its peak amplitude.

10. Apparatus as claimed in claim 6, in which the functions of the spreads of particle velocities on which said third and fourth electrical signals are arranged to be dependent are the actual and desired area under the normalized equivalent of the correlation function.

11. Apparatus as claimed in claim 6, in which the means for deriving a correlation function comprises two transducers responsive to noise in said flow system and spaced apart along the direction of flow and a cross correlator responsive to said transducers.

* * * * *